July 21, 1953

I. T. QUARNSTROM 2,645,815

EJECTOR PIN ASSEMBLY FOR MOLD BASES

Filed Nov. 23, 1951

INVENTOR.
IVAR T. QUARNSTROM.
BY
Robert A. Sloman
ATTORNEY.

Patented July 21, 1953

2,645,815

UNITED STATES PATENT OFFICE 2,645,815

EJECTOR PIN ASSEMBLY FOR MOLD BASES

Ivar T. Quarnstrom, New Haven, Mich.

Application November 23, 1951, Serial No. 257,925

1 Claim. (Cl. 18—42)

This invention relates to mold bases for injection plastic molding, and more particularly to the ejector and ejector pin construction and means for assembling the same forming a part of such mold base.

Heretofore, the conventional ejector pin had an annular head thereon of increased diameter adapted for positioning within a corresponding undercut recess within the secondary plate secured to the ejector plate. Normally, the counter-bore upon the undersurface of the secondary ejector plate was a predetermined diameter for a particular size of pin head, and therefore required different diameters of counter-bores for various sizes of ejector pins. This necessitated boring tools of different sizes.

It is the object of the present invention to eliminate the use of the counter-bore within the adjacent surface of the secondary ejector plate whereby ejector pins with any size diameter of head may be used.

It is the further object of this invention to provide a novel simplified ejector pin assembly for an ejector plate which is less expensive and more simplified than methods heretofore used.

These and other objects will be seen from the following specification and claim in conjunction with the appended drawing in which:

It will be understood that the above drawing illustrates merely one preferable embodiment of the invention and that other embodiments are contemplated within the scope of the claim hereafter set out.

Figure 1:
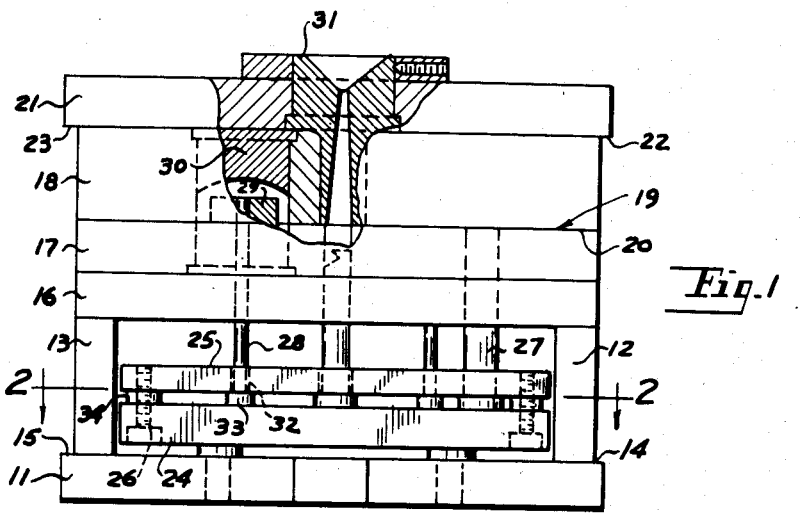
Fig. 1 is a partially broken away and sectioned elevational view of a mold base.

Referring to the drawing Fig. 1 shows the mold base as having a substantially rectangular anchor plate 11 with two parallels 12 and 13 disposed thereon and secured thereto in spaced relation. Said parallels are placed inwardly of the edges of anchor plate 11 to provide extending portions 14 and 15 to permit clamping thereof to a molding machine.

A back-up plate 16 rectangular in shape is positioned upon the top edges of parallels 12 and 13, is suitably secured thereto, and provides a means for supporting the removable and interchangeable rear cavity retainer plate 17.

A corresponding front cavity retainer plate 18 is provided similar in shape to said rear cavity plate for compressive cooperative engagement with respect thereto. Both the upper surface 19 of plate 17 and the lower surface 20 of plate 18 are initially blank, but are adapted to have inserted therein corresponding and mating molds and cores within which is injected a plastic material to be molded therein.

Another plate 21 corresponding to anchor plate 11 is suitably secured to cavity plate 18 and similarly the edges 22 and 23 of plate 21 extend beyond the outer edges of plate 18 to permit clamping thereof within the stationary portion of a molding machine.

A rectangular ejector plate is indicated at 24 longitudinally disposed between the two parallels 12 and 13 and adapted for manually or mechanically actuated upward and downward sliding movements between anchor plate 11, and back-up plate 16 upon which cavity retainer plate 17 is mounted.

A secondary ejector plate 25 is secured upon ejector plate 24 by the socket headed screws 26, and is adapted to retain and secure in upright position the spaced push-back pins 27, one of which is shown in the drawing for illustration.

An ejector pin 28 is shown in Fig. 1 as also secured by secondary ejector plate 25 to ejector plate 24, so as to extend upwardly through corresponding openings in back-up plate 16 and also into openings within the core 29. The latter is positioned by the mold maker within rear cavity plate 17 in corresponding and cooperating aligned relation with the mold 30 positioned and secured within front cavity plate 18.

Upon outward movement of ejector plate 24—25 in addition to outward movement of ejector pins 28, one of which is shown, a corresponding outward movement is given to push-back pins 27. When the cavity plates 17 and 18 are again brought together within a suitable molding machine the outer ends of push-back pins 27 engage the surface 20 of plate 18 whereby said ejector plate 24—25 is forced back to its inoperative position as shown in Fig. 1.

In operation, in carrying out injection molding the two plates 17 and 18 are tightly brought together and a plastic molding material is supplied through the hollow throated sprue bushing 31 for injection into the core and cavity 29 and 30.

Figure 4:
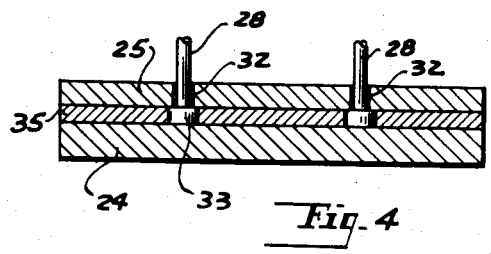
Fig. 4 is an elevational section of a slightly different form of ejector plate and ejector pin assembly.
Figures 2, 3:
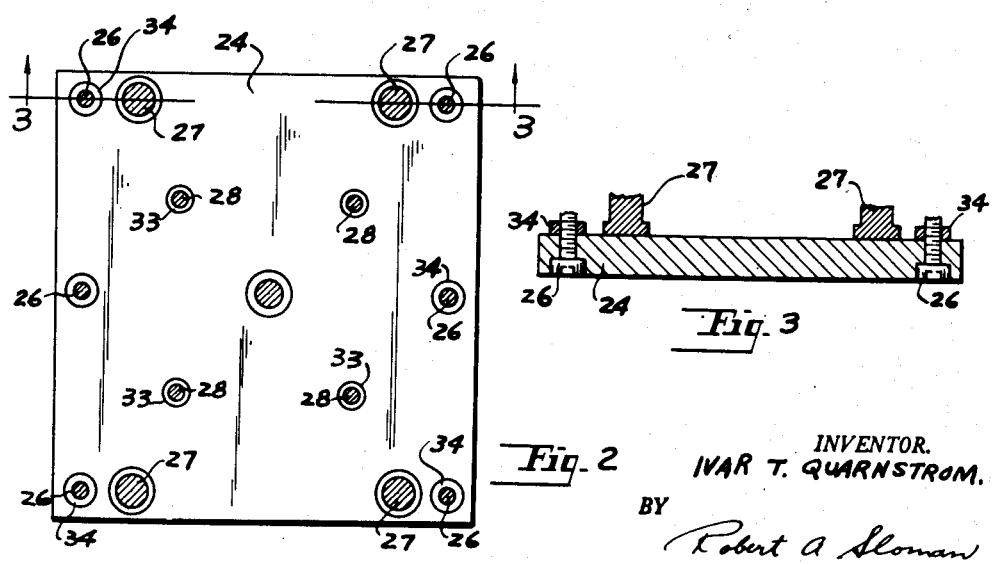
Fig. 2 is a section taken on line 2—2 of Fig. 1.
Fig. 3 is a section taken on line 3—3 of Fig. 2.

A plurality of transverse openings 32, Figs. 1 and 4, are formed within secondary ejector plate 25 to loosely and slidably receive ejector pins 28. Said pin, having an annular head 33 of a diameter greater than the diameter of the ejector pin stem, is adapted to bear upon the top surface of ejector plate 24. The bottom surface of the secondary ejector plate 25 cooperatively bears upon the heads 33, and plates 24 and 25 are secured together by the socket headed screws 26.

Spacers or washers 34 are mounted on the screws 26 and interposed between plates 24 and 25.

It is contemplated that the spacers or washers 34 be of exactly the same height as the height of the heads 33 of said ejector pins. Thus, with the screws 26 drawn up tightly the ejector pins will be effectively secured with respect to plates 24 and 25.

The over-size openings 32 in plate 25 permit some flexibility of ejector pins 28, so that the same will move through the aligned apertures formed within the plates 16 and 17 and the core 29. The over-size openings 32 thus permit a certain degree of flexibility, but at the same time the ejector pins are effectively anchored.

It is contemplated that to make the ejector pin assembly universal, it is desirable that all ejector pins have circular heads of the same height and furthermore that the spacers or washers 34 also have the same height.

It is contemplated that in the event there should be a variation between said heights, then an additional washer or shim should be added upon the present washer 34 so that their combined heights exactly equal the height of the ejector pin head.

A slight variation of the invention is shown in Fig. 4 wherein an apertured spacer plate 35 is employed between plates 24 and 25 in place of the individual washers 34. In this case, the plate 35 will have transverse apertures formed therein of the correct diameter as to loosely receive the heads 33 of ejector pins 28.

Having described my invention, reference should now be had to the claim which follows for determining the scope thereof.

I claim:

In combination, an ejector plate, a secondary ejector plate in parallel spaced relation therewith and having a transverse opening therethrough, an ejector pin having an elongated shank loosely positioned through said opening and having a disc-like head of increased diameter at one end interposed between said plates, a plurality of longitudinally spaced screws arranged around said plates adjacent their edges extending through one plate and threadably engaging the other for compressively retaining said head between said plates, and a circular centrally apertured spacer on said screws intermediate said plates and of the same height as the height of said head.

IVAR T. QUARNSTROM.

References Cited in the file of this patent

UNITED STATES PATENTS

| Number | Name | Date |
|---|---|---|
| 1,170,455 | Mason | Feb. 1, 1916 |
| 2,148,084 | Nock | Feb. 21, 1939 |
| 2,531,965 | Beck et al. | Nov. 28, 1950 |